June 27, 1944.  W. F. ALLER ET AL  2,352,507
GAUGING DEVICE
Filed July 3, 1942  5 Sheets-Sheet 3

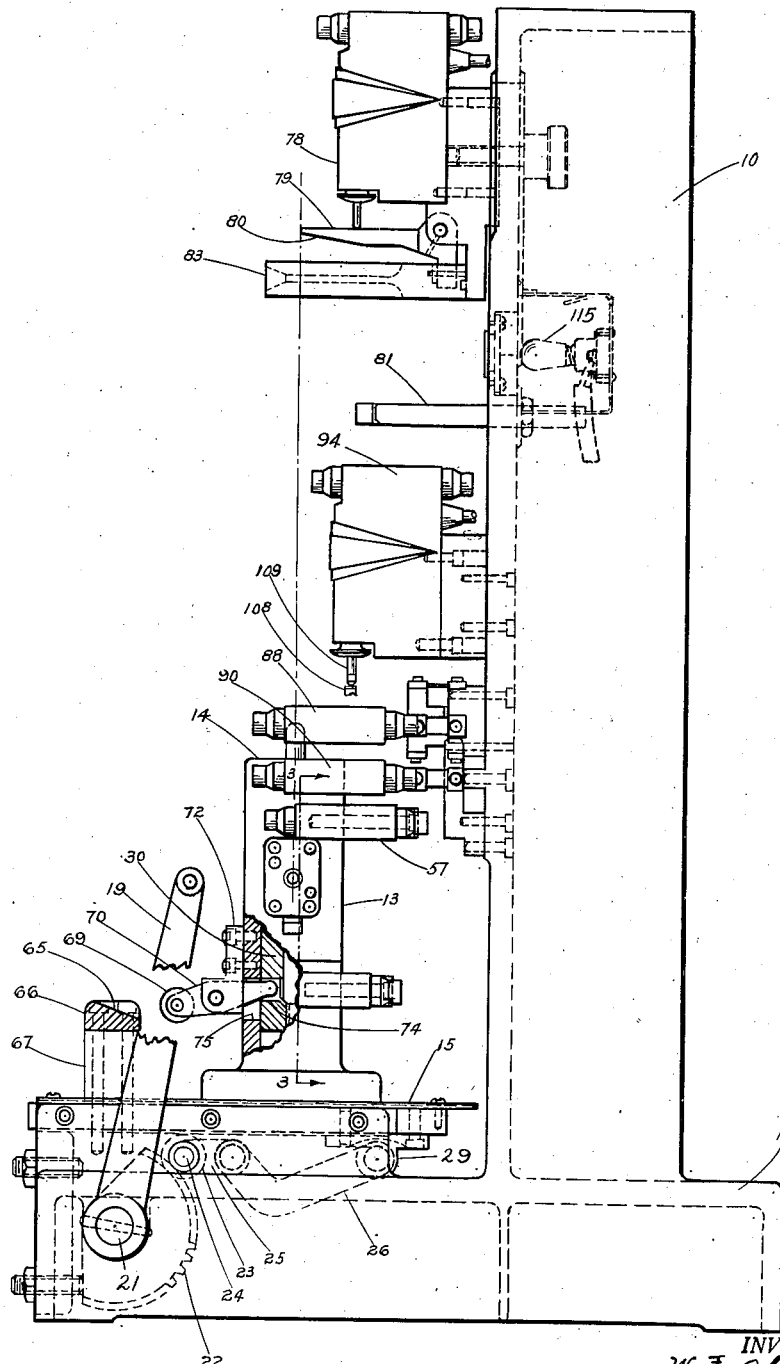

INVENTORS
W. F. Aller &
L. J. Mahlmeister
BY Edward J. Noë Jr.
atty

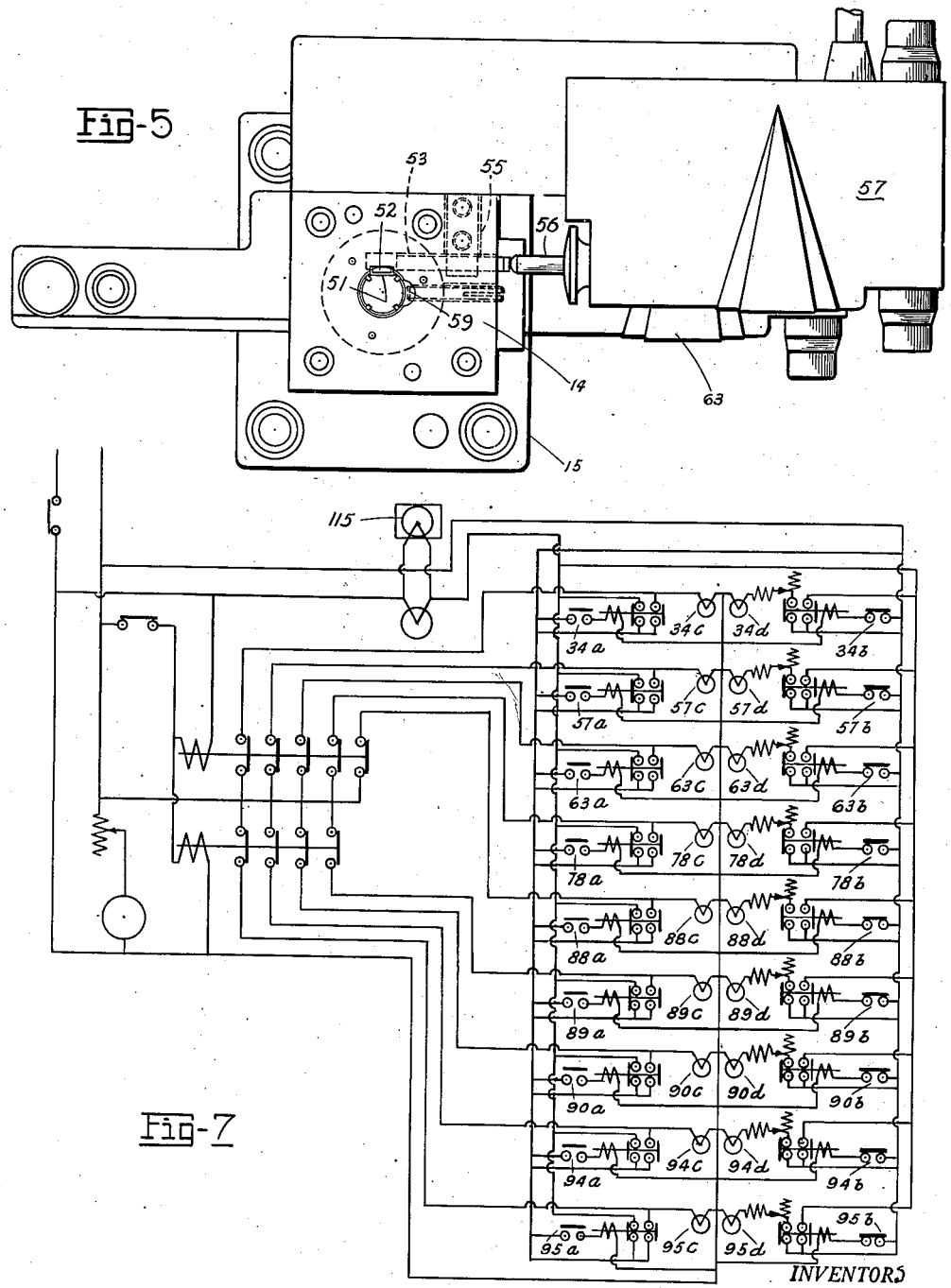

Patented June 27, 1944

2,352,507

UNITED STATES PATENT OFFICE 2,352,507

GAUGING DEVICE

Willis Fay Aller and Louis J. Mahlmeister, Dayton, Ohio, assignors to The Sheffield Corporation, Dayton, Ohio, a corporation of Ohio Application July 3, 1942, Serial No. 449,569

6 Claims. (Cl. 33—174)

This invention relates to measuring or gauging apparatus for accurately gauging sizes of a measured part.

One object of the invention is the provision of a gauging apparatus for gauging or comparing a dimension of a workpiece, and embodying a tapered working gauging member adapted for axial movement and engagement with the work and centering the work in a predetermined position, together with gauging means operable in accordance with the axial position of the tapered work engaging member when engaging the work.

Another object is the provision of a gauging apparatus including a work holder for positioning the work and arranged for movement on a support from a work receiving to a work gauging position to present the work to gauging devices carried by the support, the work holder having an axially movable member adapted for telescopic engagement with the work and gauging means for such member adapted for gauging the position to which the member is moved.

Another object is the provision of a gauging apparatus having a work holder provided with a work engaging and locating surface and a cooperating tapered work gauging member which is yieldingly urged to a projected position, with gauging means for measuring the extent to which it is projected, the work engaging member having means for withdrawing or retracting it to facilitate disengagement of the work.

Other objects and advantages of the invention will be apparent from the following description, the appended claims and the accompanying drawings.

In the drawings, in which the same reference characters have been applied to like parts in the several views;

Fig. 2 is a side elevation, partly in vertical section, of the gauging apparatus;

Fig. 5 is a top plan view of the work holder;

Fig. 7 is a diagrammatic illustration of the electrical connections to the several gauging devices.

Figure 1:
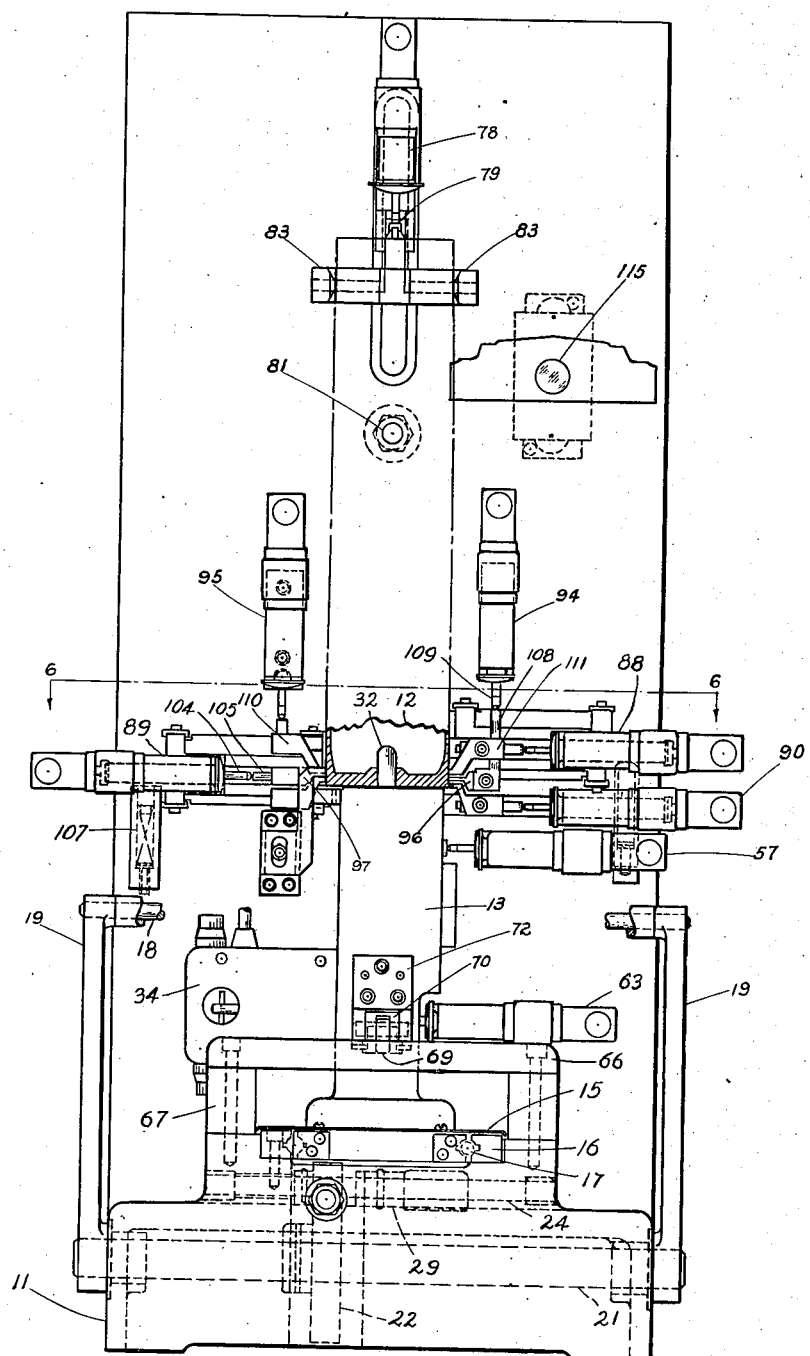
Fig. 1 is a front elevation of a gauging apparatus embodying the present invention.
Figure 4:
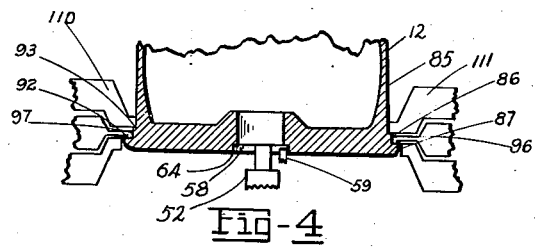
Fig. 4 is an enlarged view showing a portion of the work and the work contacting portions engageable therewith.

Referring more particularly to the drawings, in which a preferred form of the invention has been illustrated as embodied in a gauging apparatus for simultaneously gauging or comparing a large number of dimensions of a shell or other workpiece, the gauging apparatus comprises a suitable support 10 having a base portion 11. A number of gauging devices are arranged on the support, as will be more fully described, for cooperation with the work when the latter is moved into gauging position. It will be understood that the work may take any one of a large number of different shapes or forms, although the invention as herein described and illustrated is in a form particularly adapted for gauging internal and external measurements of an elongated workpiece such as a shell. While the term shell will be used in the specification to designate the workpiece, that term designates any other workpiece that may be gauged or measured.

The shell, designated 12, is applied to a work holder 13, with the end of the shell resting on the work carrying surface 14 provided at the upper end of a pedestal portion of the holder. The pedestal is mounted on a table 15, horizontally operable along tracks or ways 16. Suitable anti-friction bearing members 17, preferably ball bearings, are interposed between the track 16 and the table 15 so that the latter is free to move from a position somewhat remote from the support 10, where the shell can be readily applied to the holder, into the position shown in Fig. 2, in which the shell is in position for cooperation with the gauging devices that are mounted on the support 10. The work holder can be moved towards the left as viewed in Fig. 6, to move the work away from the support, by pulling the rod 18, which is carried by levers 19 secured to a control shaft 21. This rotates a gear segment 22 fixed on the shaft, and operates an intermeshing gear 23 on a shaft 24 which is journalled in the side walls of the base 11. Gear 23 is fixed to a link 25 of a toggle linkage including a second link 26 which is pivoted to an ear 29 fixed on the table 15. By pulling the rod 18 towards the left, the table is moved to retract the work from gauging position to a withdrawn position in which the shell can be readily applied to or removed from the work holder. This holder also supports a plurality of gauging devices which gauge radial and axial dimensions of the shell.

Figure 3:
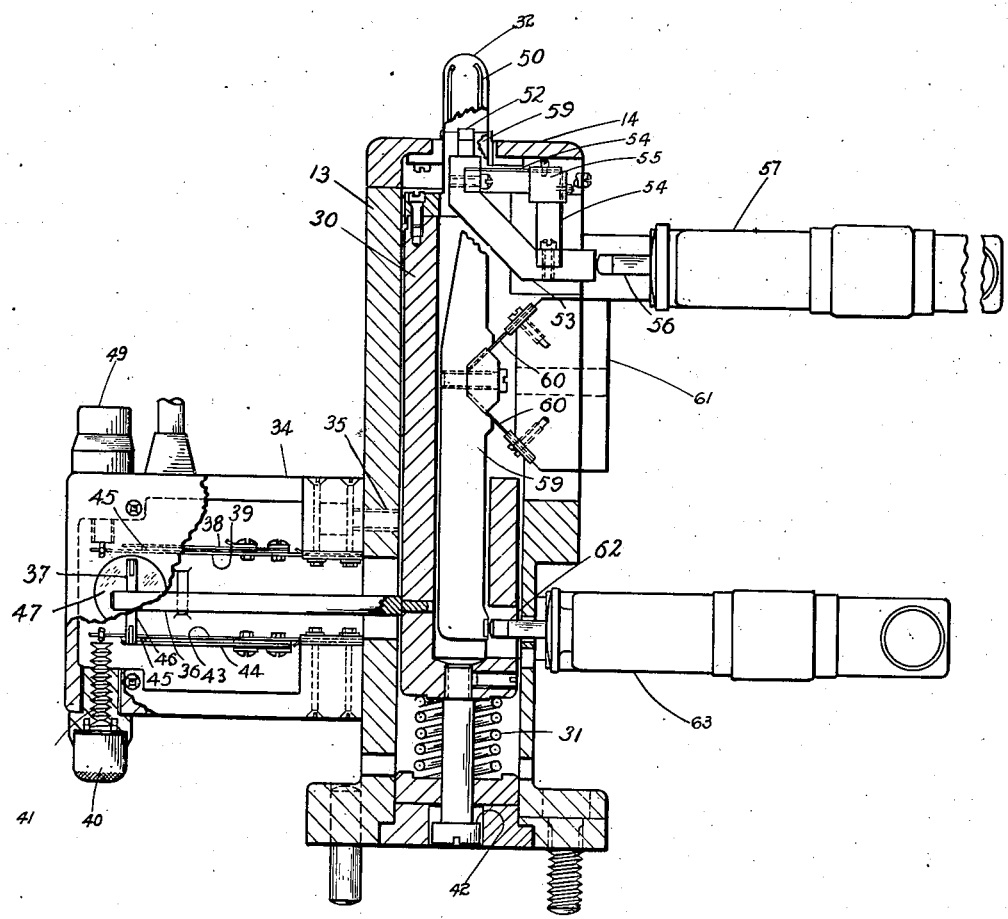
Fig. 3 is a central vertical section of the pedestal portion of the work holder.

Slideably carried within the hollow pedestal of the work holder, as shown in Fig. 2, is a vertical slide 30. At the particular point where the section of Fig. 3 is taken, there happens to be clearance shown between the slide 30 and the pedestal or work holder 13, but it should be understood that the other portions of these two parts have a close sliding fit. Means, preferably a spring 31, is provided to yieldingly urge the slide 30 upwardly to project a work centering and gauging member 32 which is fixed to the upper end of the slide 30 and which operates through a hold in the upper end of the pedestal. The member 32 has a slight taper, being slightly less in diameter near its upper portion than at its lower portion, and is shown as a plug adapted to enter a hole in the lower end of the shell to position or center the work accurately in a predetermined position when the work is applied to the supporting surface 14. When the operator places the shell on the surface 14, the plug 32 is lowered by the shell against the action of the spring 31. The spring 31 is preferably strong enough to hold the plug 32 in its projected position, but not strong enough to overcome the weight of the shell when the shell is applied. In view of the very slight taper which is given to the plug 32, the vertical position of the plug 32 forms a very accurate indication of the size or diameter of the part telescoped thereby.

Cooperating with the slide 30 is a gauge head 34, preferably fixed on the pedestal portion of the work holder 13 as by means of suitable attaching screws 35. The gauge head carries upper and lower pairs of switch blades controlling a pair of electric circuits, and either pair of switch blades may be opened by a bar 36 which is rigidly supported on and projects from the slide 30 as shown in Fig. 3. It is visible through a window 47. When the bar is raised to an upper limiting position determined by a stop 42, by the projecting movement of the spring 31 with no work applied to the work holder, the upwardly projecting insulating stud 37 fixed on the bar 36 engages a spring blade 38 and moves it out of contact with the second spring blade 39, thus opening a circuit connected to these two spring blades and producing an indication on a suitable indicating device, as will be presently described. In a similar manner, the spring blades 43 and 44 which are normally in contact with one another at 45 may be separated by the downwardly extending stud portion 46 on bar 36 if the slide 30 and plug 32 are pushed down beyond a normal amount by the work when the work is applied to the holder. The normal position of the spring blade 43 is determined by an adjustment knob 40 which is rotatably carried on the gauge head, and which has fixed thereto a threaded portion 41 operating in a nut and thus axially movable as the knob 40 is turned. A similar adjustment knob 49 is provided to determine the normal position of the spring blade 39. By adjustment of the knobs 40 and 49 the distance which the rod 36 can travel without opening either one of the two pairs of spring blade contacts can be adjusted, and anywhere in this range both circuits controlled by the two pairs of spring blade contacts will remain closed and give an indication on the indicating means that the hole in the work conforms to a predetermined dimension that is within the required size limits.

The plug 32 is preferably provided with several vertically extending work contacting portions 50 in the form of vertical strips projecting slightly from the remaining portions of the plug to relieve such remaining portions from wear. One side of the plug 32 is cut away as indicated at 51 to provide space for a work engaging finger 52 which is vertically movable so that it may contact with a downwardly facing surface on the work, such as the shoulder surface 58. This finger 52 is fixed on a block 53 which is fulcrumed for movement substantially at the point of intersection of spring blades 54 by means of which the block 53 is carried. The two spring blades 54 are arranged at 90° from one another and one end of each is secured to the block 53 while the other end of each is secured to a projection 55 forming part of the pedestal. As the finger 52 is moved downwardly by the work when the work is applied to the work holder 14, the lower end of the block 53 will move horizontally and operate the plunger 56 of a gauge head 57 which is supported directly on the pedestal. The gauge head 57 incorporates gauging mechanism such as is disclosed in Patent No. 2,254,812, granted September 2, 1941, and this mechanism is electrically connected to a suitable indicating means which enables the operator to see whether the part gauged is of the required size.

A lever 59 is supported within the slide 30 by means of a pair of spring blades 60, secured at one end to the lever and diverging at 90° to one another with their outer ends fixed to a block 61 which is secured to or forms a part of the pedestal. The lower end of this lever bears against a plunger 62 of a gauge head 63 which is similar in construction and operation to the gauge head 57. The upper end of the lever 59 moves laterally as viewed in Fig. 3, and contacts against the cylindrical interior surface 64 at the lower end of the shell. As the plug 32 accurately centers the shell on the supporting surface 14, the lateral movements of the upper end of the lever 59 as positioned by the surface 64 of the shell produces an indication on the gauge device 63 in accordance with the size of the gauged surface so that the operator can determine whether or not this gauged surface is too large or too small or conforms to a required size range.

The work is applied to the supporting surface 14 of the work holder when the work holder is in its outer or loading position, with the bar 18 swung to the left as viewed in Fig. 2, and in this position the tapered plug 32 and the slide 30 which carries it are held down or retracted to some extent although the plug still projects up above the surface 14. The slide 30 is held down, under these conditions, by means of an inclined cam surface 65 on a bar 66 extending transversely across the front of the apparatus and mounted at the upper ends of pillars or braces 67. The cam surface 65 engages a roller 69 carried on a lever 70 which is pivoted at 71 on a bracket 72 which is fixed to the pedestal. The opposite end of the lever 70 is rounded and projects through a slot 75 in the side of the pedestal and operates in a hole or slot 74 in the slide 30. When the pedestal is moved to the left from the gauging position indicated in Fig. 2, the roll 69 will ride up on the cam 65 and swing the lever 70 clockwise far enough to retract the slide 30, and pull down the plug 32. Thus the tapered plug, which may tend to hold in the shell into which it telescopes, is positively pulled down free of the shell to facilitate removal of the shell after the gauging operation is completed. When the work is applied to the holder, it is approximately centered by placing it on the retracted plug; and then the plug is projected by the spring 31 when the operator swings the rod 18 to move the work holder towards gauging position, as the roller 69 then rides off the cam and the spring 31 becomes effective to project the plug until it is stopped by the work.

When the work is moved, by moving the work holder, into gauging position, it is brought into engagement with additional gauging devices mounted on the support 10. The total height of the shell is gauged by means of a gauge head 78 under the control of a lever 79 having an inclined cam surface 80 which is engaged and moved by the upper end of the shell. The shell is held by the operator against a backstop 81 which projects from the support 10 and thus locates the shell accurately in a vertical plane. Suitable lateral guides 83 fixed on the support 10 cooperate with the backstop 81 in locating the axis of the shell accurately in vertical position.

Figure 6:
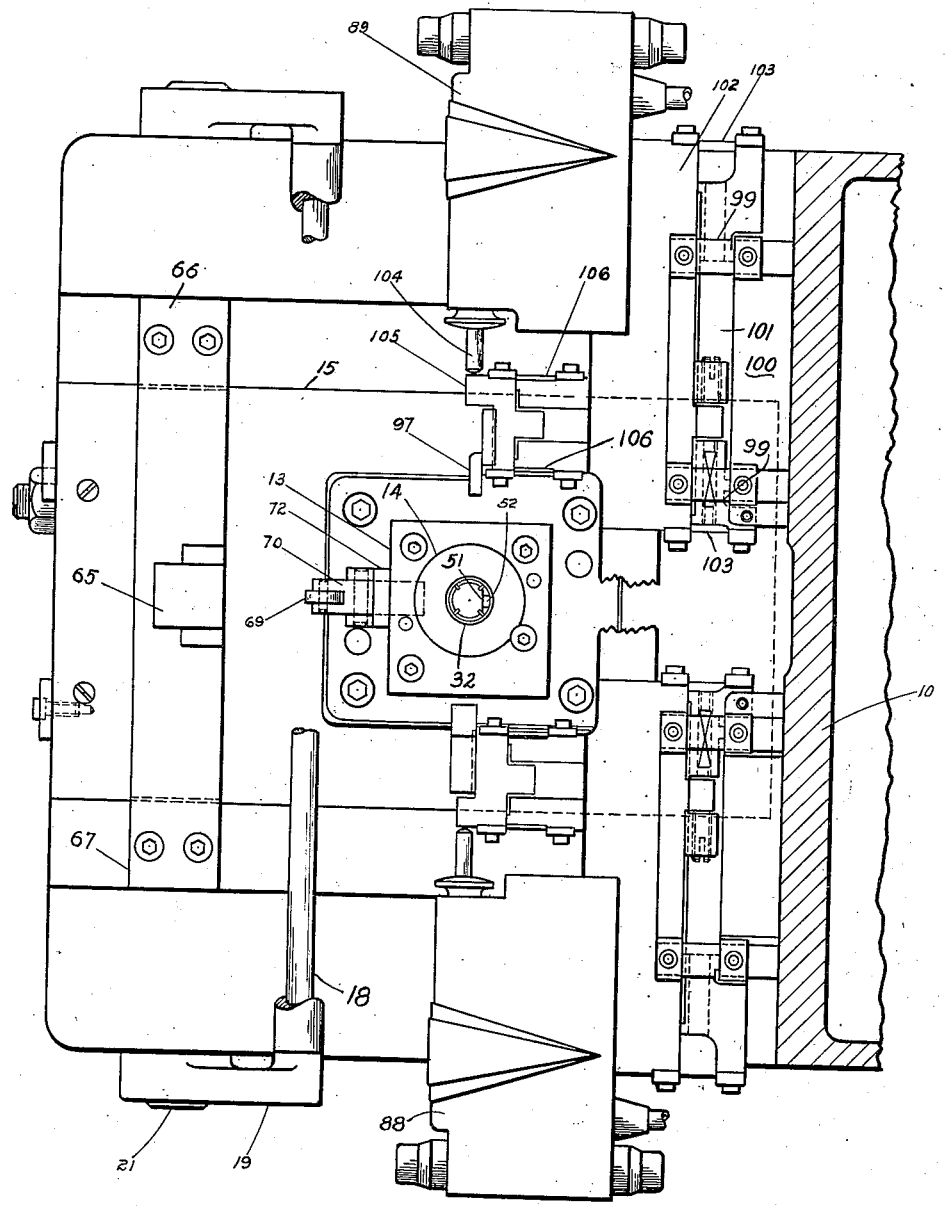
Fig. 6 is a horizontal section on the line 6—6 of Fig. 1.

The diametrical dimensions of the surfaces 85, 86 and 87 are gauged by means of gauge heads 88, 89 and 90 respectively, and the distance from the lower end of the shell to the shoulder surfaces 92 and 93 respectively, are gauged by means of the gauge heads 94 and 95. The relative horizontal movements of the work engaging fingers 96 and 97 control the indications of the gauge head 89, measuring the diameter of the surface 86, and the vertical position of these fingers control the operating plunger 97 of the gauge head 94, the work engaging fingers 96 and 97 being yieldingly mounted by means of parallel spring blades for horizontal movement, and by additional spring blades for vertical movement. The spring blades which mount the gauge head 89 for vertical movement are indicated at 99 in Fig. 6. These spring blades are attached to a block 100 fixed on the support 10, and at their outer ends are secured to a carrier 101 so that the carrier can move up and down to a limited extent. The carrier is connected to the bar 102, which carries the finger 96, by means of a pair of parallel spring blades 103 thus mounting the bar 102 for yielding movements in a horizontal direction. Gauge head 89 is fixed to and thus moves vertically and horizontally with the bar 102. Its operating plunger 104 is controlled by a blade supported block 105 carried by spring blades 106 which are secured at one end to the bar 102 as shown in Fig. 6. The block 105 carries the work engaging finger 97. The weight of the gauge head and of the bar 102 is counterbalanced by means of a spring-pressed plunger in a counterbalance 107. The vertical movements of the bar 102 control the position of the plunger 108 of the gauge head 94 through a pin 109, fixed to the bar 102. In a similar, although complementary manner, the work engaging fingers 110 and 111 control the gauge head 88 to measure or gauge the diameter of the surface 85 of the shell, the gauge 88 being mounted for vertical as well as horizontal yielding movement to control the operation of the gauge head 95 and thus gauge the height of the surface 93.

A suitable indicating means is provided so the operator, after moving the work holder with the shell in place, into gauging position, can readily determine whether or not all the dimensions gauged or compared will conform to a required size standard. This indicating means is preferably a lamp 115 mounted directly on the support 10, under the control of the various electric circuits connected to the various gauging devices, the several circuits being generally as disclosed in Patent No. 2,254,812. The particular circuit diagram employed is illustrated in Fig. 7 in which the electric switches controlled by the several gauging devices 34, 57, 63, 78, 88, 89, 90, 94 and 95 are designated by corresponding numerals with the suffix a and b. Normally these circuits are closed when the part checked conforms to required sizes in the various gauged portions, as the gauges are so adjusted that this will be so, by using a part of the exact size and dimensions required, as a standard in initially setting up the apparatus for a particular gauging operation. If any dimension checked departs from a required size standard and is either too large or too small, the individual indicating means designated by the corresponding reference numerals with the suffixes c and d for the several gauges mentioned will indicate this out of size condition and also show whether the size checked is too large or too small. After gauging a shell, the operator merely pulls back on the rod 18 to withdraw the shell from gauging position and picks the shell off of the holder and replaces it with another one, the retracting movements of the plug 32 which are produced by the final withdrawal movement of the holder without further intentional action on the part of the operator serving to facilitate the disengagement of the shell. As will be quite apparent in view of the foregoing description, a large number of different measurements in both axial and diametrical dimensions can be obtained in one operation.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus comprising a work holder having a work engaging and locating surface positioning the work in one plane, a tapered work engaging member axially movable on the work holder to engage and center the work in a predetermined position in said plane, means for gauging the axial position of said work engaging member when engaging the work, and means for positively retracting said tapered member to facilitate removal of the work.

2. Gauging apparatus comprising a support, a work holder operably mounted on said support and having a work engaging and locating surface positioning the work in one plane, a tapered work engaging member axially movable on the work holder to engage and center the work in a predetermined position in said plane, means yieldingly urging said work engaging member to a projected position, means for gauging the axial position of said work engaging member when engaging the work, and means operable to retract the work engaging member to facilitate removal of the work.

3. Gauging apparatus comprising a work holder having a horizontal work engaging surface, a tapered work engaging member vertically movable on the work holder to engage and center the work in a predetermined position, means for gauging the axial position of said work engaging member when engaging the work, spring means for yieldingly urging said member upwardly and adapted to be overcome by the weight of the work, and means operable to retract said member.

4. Gauging apparatus comprising a work holder having a work engaging and locating surface positioning the work in one plane, a tapered work engaging member axially movable on the work holder to engage and center the work in a predetermined position in said plane, spring means urging said work engaging member to a projected position, means for gauging the axial position of said work engaging member when engaging the work, supporting means for said work holder, means for moving said work holder on said supporting means from a work receiving to a work gauging position, and means operable to retract the work engaging member after the work holder has been moved out of gauging position and before it is returned to work receiving position.

5. Gauging apparatus comprising a work holder having a substantially horizontal work engaging and locating surface to position the work in one plane, a tapered work engaging plug vertically movable on the work holder to engage and center the work in a predetermined position in said plane, means yieldingly urging said work engaging member upwardly, gauging means operated by said plug, means for positively retracting the work engaging member to facilitate removal of the work, and additional means carried by said work holder for gauging an internal diameter of the surface of the work adjacent the surface gauged by said tapered plug.

6. Gauging apparatus comprising a support, a work holder movably carried by said support and having a work locating surface to position the work in one plane, a tapered work engaging member axially movable on said work holder to engage and center the work in a predetermined position in said plane, means for gauging the axial position of said work engaging member when engaging the work, gauging means carried by said support, means for moving the work holder to gauging position to bring the work into cooperative engagement with said last named gauging means, holding means normally retaining said work engaging member in a retracted position, and means for releasing said holding means when the work holder is moved to gauging position.

WILLIS FAY ALLER.
LOUIS J. MAHLMEISTER.